United States Patent [19]
Zimmermann

[11] Patent Number: 5,171,008
[45] Date of Patent: Dec. 15, 1992

[54] APPARATUS FOR STACKING PIECES OF MAIL HAVING A PRESSURE ROLLER

[75] Inventor: Armin Zimmermann, Konstanz, Fed. Rep. of Germany

[73] Assignee: Licentia Patent-Verwaltungs-GmbH, Frankfurt, Fed. Rep. of Germany

[21] Appl. No.: 343,727

[22] Filed: Apr. 27, 1989

[51] Int. Cl.$^5$ ............................................. B65H 29/40
[52] U.S. Cl. ........................................ 271/178; 271/2; 271/214
[58] Field of Search ................... 271/2, 177, 178, 180, 271/181, 184, 198, 213-215, 217, 306

[56] References Cited

U.S. PATENT DOCUMENTS

| | | | |
|---|---|---|---|
| 3,087,725 | 4/1963 | Duncan | 271/306 |
| 3,584,869 | 6/1971 | Traphagen | 271/178 |
| 4,019,730 | 4/1977 | Staudinger et al. | 271/214 |
| 4,046,371 | 9/1977 | Sevak | |
| 4,203,589 | 5/1980 | Arrasmith | 271/178 X |
| 4,509,739 | 4/1985 | Kurokawa | 271/215 X |
| 4,570,922 | 2/1986 | Akers | 271/178 |
| 4,591,142 | 5/1986 | Divoux et al. | 271/178 X |
| 4,625,870 | 12/1986 | Nao et al. | 271/178 X |
| 4,643,626 | 2/1987 | Noguchi et al. | 271/215 X |
| 4,750,728 | 6/1988 | Keller | 271/214 X |

FOREIGN PATENT DOCUMENTS

| | | |
|---|---|---|
| 0049718 | 4/1982 | European Pat. Off. |
| 0127067 | 12/1984 | European Pat. Off. |
| 570002 | 1/1933 | Fed. Rep. of Germany |
| 1113182 | 8/1960 | Fed. Rep. of Germany ...... 271/178 |
| 1195987 | 7/1965 | Fed. Rep. of Germany ...... 271/178 |
| 2517369 | 8/1976 | Fed. Rep. of Germany |
| 3317865 | 11/1984 | Fed. Rep. of Germany |
| 3700827 | 7/1988 | Fed. Rep. of Germany |
| 87433 | 6/1966 | France ...... 271/178 |
| 495682 | 2/1976 | U.S.S.R. ...... 271/178 |
| 2104494 | 3/1983 | United Kingdom ...... 271/178 |

OTHER PUBLICATIONS

Patent Abstracts of Japan; Band 9, No. 191 (M-402) [191u], 7, Aug. 1985, & JP A-60 56 767 (Ricoh K.K.).

*Primary Examiner*—Robert P. Olszewski
*Assistant Examiner*—Boris Milef
*Attorney, Agent, or Firm*—Spencer, Frank & Schneider

[57] ABSTRACT

A stacking device for letters or similar flat, flexible articles to be transported employing a plurality of stacking compartments to which the articles are supplied by way of switches separately associated with the individual compartments and in which the articles are stacked next to one another. A transporting roller and a stacking roller for engaging a side surface of the incoming article and a contact surface for engaging a bottom edge of the article are provided to guide the article in a transporting direction. To avoid congestion of successive articles, an additional conveying device is provided which urges the lower edge of each incoming article in the direction of the stack. The additional conveying device is a pressure roller disposed sufficiently below the contact surface of the incoming articles that part of the upper roller circumference engages the lower edge of the respective incoming article.

1 Claim, 3 Drawing Sheets

APPARATUS FOR STACKING PIECES OF MAIL HAVING A PRESSURE ROLLER

BACKGROUND OF THE INVENTION

The invention relates to a stacking device for letters and similar flat, flexible articles to be transported, the device including a plurality of stacking compartments which receive the articles by way of switches separately associated with the individual compartments, and with the articles being stacked next to one another and wherein an additional conveying device is disposed in each stacking compartment between the transporting roller and the stacking roller so as to urge the lower edge of each incoming article in the direction of the stack approximately perpendicularly to the transporting direction.

In automatic mail distribution systems, the articles are transported individually over a conveying path for the purpose of automatically reading their destination and later sorting them and, by way of a compartmented path equipped with switches, they are assigned according to their postal code regions to a plurality of stacking compartments where they are stacked.

In order to obtain the highest possible throughput, the articles move on the conveyor belt with the greatest possible speed and with the smallest possible distances between them. Under these circumstances, the problem of congestion occurs in connection with articles assigned to the same stacking compartment. This is caused by the leading edge of the subsequent article running onto the trailing edge of the preceding article.

DE-OS 3,317,865 discloses a system in which vertically stacked articles resting on their lower longitudinal edge enter the system in that their lower front edge enters tangentially into a rotating spindle wheel and, in the course of the article entering into the stacking compartment, the side of the spindle wheel transports the subsequent portions of the article, particularly its rear region, in the direction of the already stacked articles so that the subsequent article will reliably enter the stacking compartment next to the preceding article.

However, a spindle wheel drive for each stacking compartment is very complicated and expensive, particularly for fine distribution systems which employ a large number of small capacity stacking compartments and operate with a smaller throughput.

SUMMARY OF THE INVENTION

It is the object of the invention to find a solution for stacking device for letters and similar flat, flexible articles to be transported, the device including a plurality of stacking compartments which receive the articles by way of switches separately associated with the individual compartments, and with the articles being stacked next to one another and wherein an additional conveying device is disposed in each stacking compartment between the transporting roller and the stacking roller so as to urge the lower edge of each incoming article in the direction of the stack approximately perpendicularly to the transporting direction which solution is significantly more economical and nevertheless still operates reliably even at high stacking velocities.

This is accomplished in a stacking device of the above type, wherein a pressure roller is provided as the additional conveying device, and wherein the pressure roller is disposed so far below the contact surface of the incoming articles that part of its upper roller circumference engages the lower edge of the respective incoming article.

A simple inexpensive additional pressure roller which is disposed below the contact surface of the incoming articles and whose upper roller circumference projects somewhat from the contact surface engages, in the course of the entrance of the article, particularly its lower rear edge to urge it in the direction of the stack so that the subsequent article will reliably enter the stacking compartment next to the preceding article.

The contact of the pressure roller with the lower edge of the article may be effected by means of a friction lock, e.g. a rubber roller, or by a form lock, advantageously by means of a toothed wheel which reliably urges the articles in the direction of the stack without interfering with them in the transporting direction. The sawtooth shape of the teeth provides for better entrance of the article into the toothed wheel. The embodiment of the invention wherein the axis of the pressure roller extends almost parallel to the contact surface for the stacked article and forms an angle with the lower edge of the incoming article; and the circumferential velocity vector of the pressure roller in the direction of the stack is equal to or slightly greater than the transportation velocity vector with a friction lock between a long pressure roller and the articles has the advantage of guiding and controlling the lower edge of the article and avoids deceleration of the article in the transporting direction. With a sufficiently long roller it is possible in an advantageous manner to press the lower edge of the article in the direction of the stack during its entire entrance process. Since the circumferential velocity vector of the pressure roller in the transporting direction of the article is equal to or somewhat larger than the transporting velocity, no congestion enhancing delay of the articles occurs. Moreover, the constant friction lock between the roller and the article avoids annoying noises resulting from inhomogeneous motion sequences which may occur, in particular, in the solution employing the toothed wheel.

BRIEF DESCRIPTION OF THE DRAWINGS

The invention will now be described in greater detail for embodiments thereof and with reference to the drawings.

It is shown in the individual figures.

DESCRIPTION OF THE PREFERRED EMBODIMENTS

Figure 6:
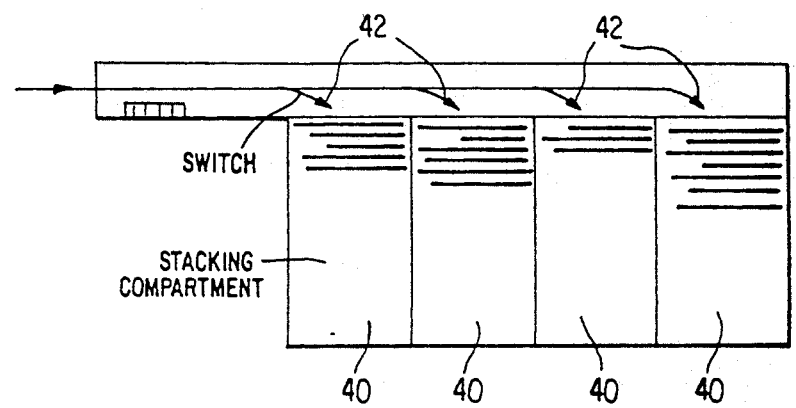
FIG. 6 is a schematic plan view of the compartments and switches according to the invention.

FIG. 6 shows schematically how articles are fed to respective stacking compartments 40 via switches 42 in a manner similar to that shown in DE-OS 3,317,865 referred to above.

Figure 1:
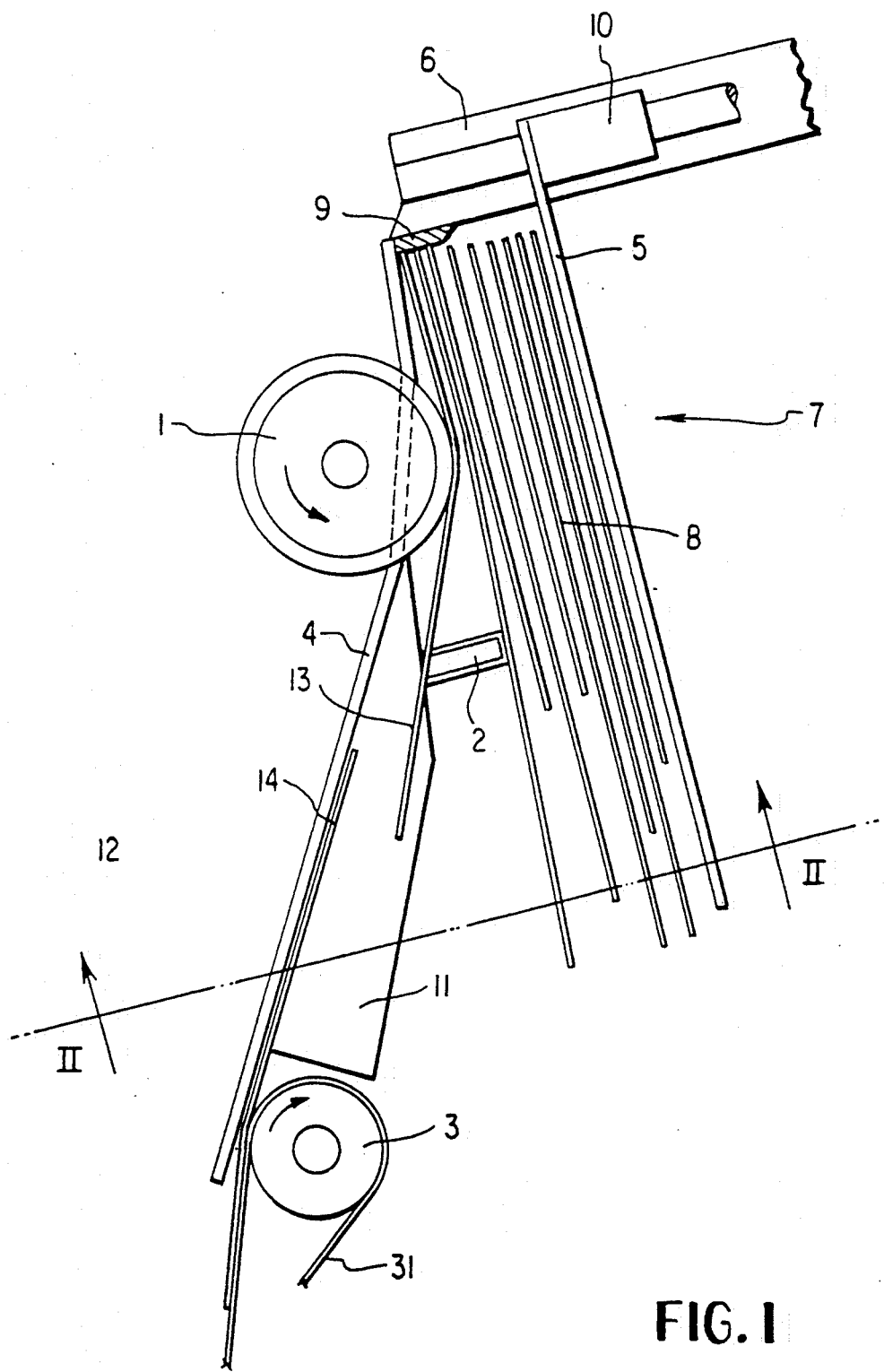
FIG. 1, a top view of a stacking compartment equipped with a pressure roller.

FIG. 1 is a schematic representation, in the form of a top view, of an individual stacking compartment. Articles 13, 14 are transported to the stacking compartment by means of a covered belt system. Only transporting roller 3 and conveyor belt 31 are shown of the covered belt system. After leaving conveyor belt 31, the article slides along a guide fence 4 over the edge of a stacking roller 1 to a stack 8 which slides on the bottom 7 of the stacking compartment and is supported by a separating blade 5 which is displaceable (to the right in FIG. 1) in a guide 10. A stop 9 for the incoming articles prevents friction of the articles with stacking compartment wall 6. As can be seen, the articles are stacked next to one another.

In order to separate successive articles, an additional conveying device 2 is disposed between transporting roller 3 and stacking roller 1 so as to urge the lower edge of each incoming article 13 in the stacking direction, approximately perpendicularly to the transporting direction. According to the invention, a pressure roller is here provided as the additional conveying device 2 which, as clearly shown in FIG. 2 in the sectional view II—II of FIG. 1, is disposed below the contact face of the incoming article—in the illustrated embodiment, a metal guide sheet 11—so that part of its upper roller circumference engages the lower edge of the incoming article 13.

Figure 2:
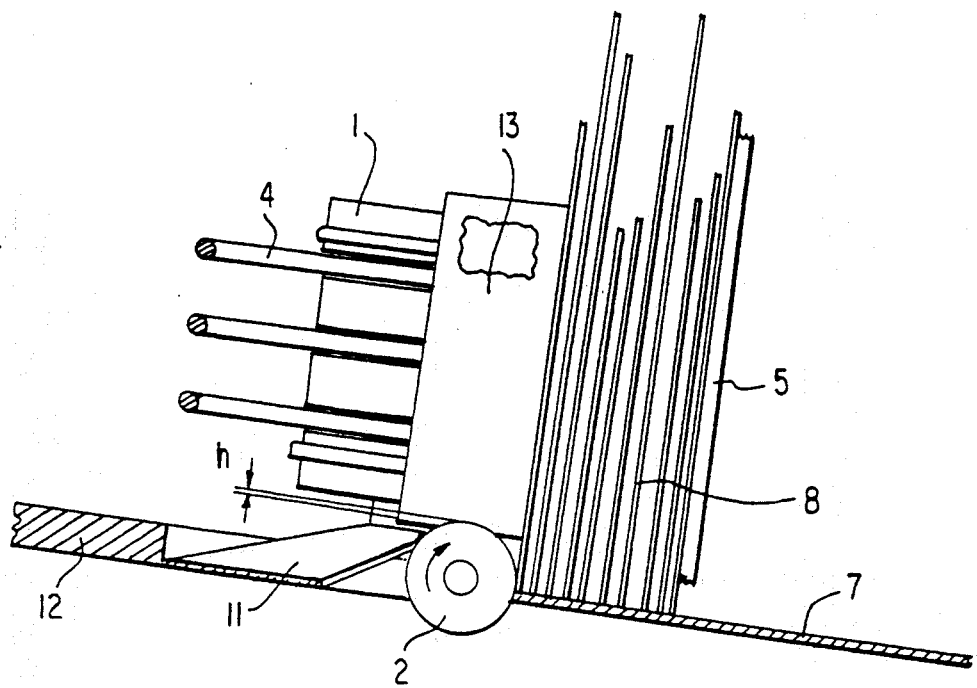
FIG. 2, a top view onto a section II—II of the stacking compartment of FIG. 1 or FIG. 5.

Metal guide sheet 11 lifts the incoming articles slightly upward from base plate 12, on which transporting roller 3, stacking roller 1, guide fence 4 and pressure roller 2 are mounted, and guides the articles almost vertically toward the circumference of the pressure roller. A comparison of FIG. 1 with FIG. 2 shows the spatial arrangement between metal guide sheet 11 and pressure roller 2. FIG. 2 and also the remaining figures show the same components always bearing the same reference numerals.

Pressure roller 2 is spaced a distance a from guide fence 4. In this way it is ensured that the leading edge of the article slides onto the side of the stacking roller uninfluenced by pressure roller 2. Only when the leading edge of the article has been engaged by stacking roller 1, has article 13 taken on a position, supported by its inherent rigidity, in which it can be taken up by pressure roller 2. The stack pressure and the relatively high coefficient of friction between stacking roller 1 and article 13 form a vertical clamp for the article. Due to the difference in height h between the lower edge of the article and pressure roller 2, the relatively great inherent rigidity of the articles in the vertical direction and the leading edge of the article clamped in between stacking roller 1 and stack 8, the lower edge of the stack moves in the direction of pressure roller 2, is taken up by it and accelerated in the direction of the stack. Thus, the trailing edge of the article, in particular, is transported in the desired manner out of the entrance region of the next-following article 14.

Figure 3:
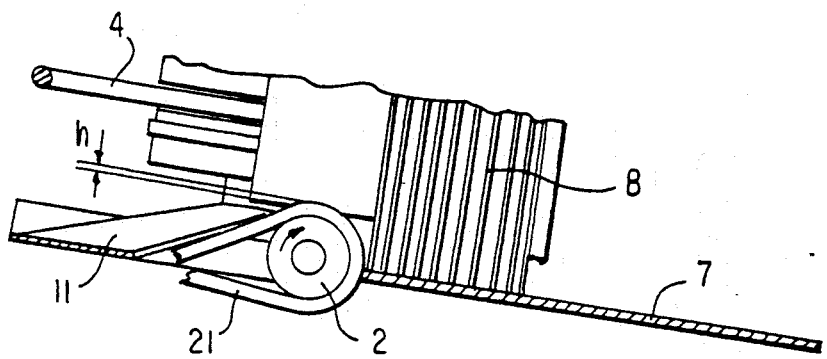
FIG. 3, a detail view of FIG. 2 including a belt above the pressure roller.

In order to increase the effective range of pressure roller 2, one embodiment of the invention provides for a friction belt 21 which is tensioned over the pressure roller 2 as shown in FIG. 3.

Figure 4:
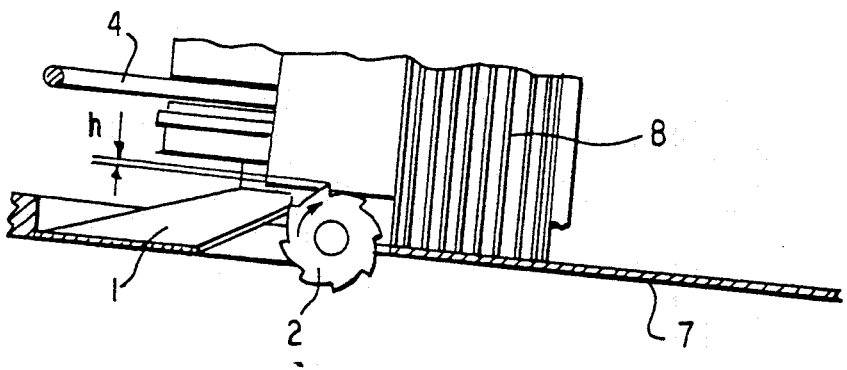
FIG. 4, a detail view of FIG. 2 including the toothed wheel as the pressure roller.

FIG. 4 shows an embodiment of the invention including a form lock between pressure roller 2 and the lower edge of the article. Pressure roller 2 is configured as a toothed wheel, advantageously, as shown in the drawing figure, in a sawtooth shape, which provides for reliable take-up of the lower edge of the article.

Figure 5:
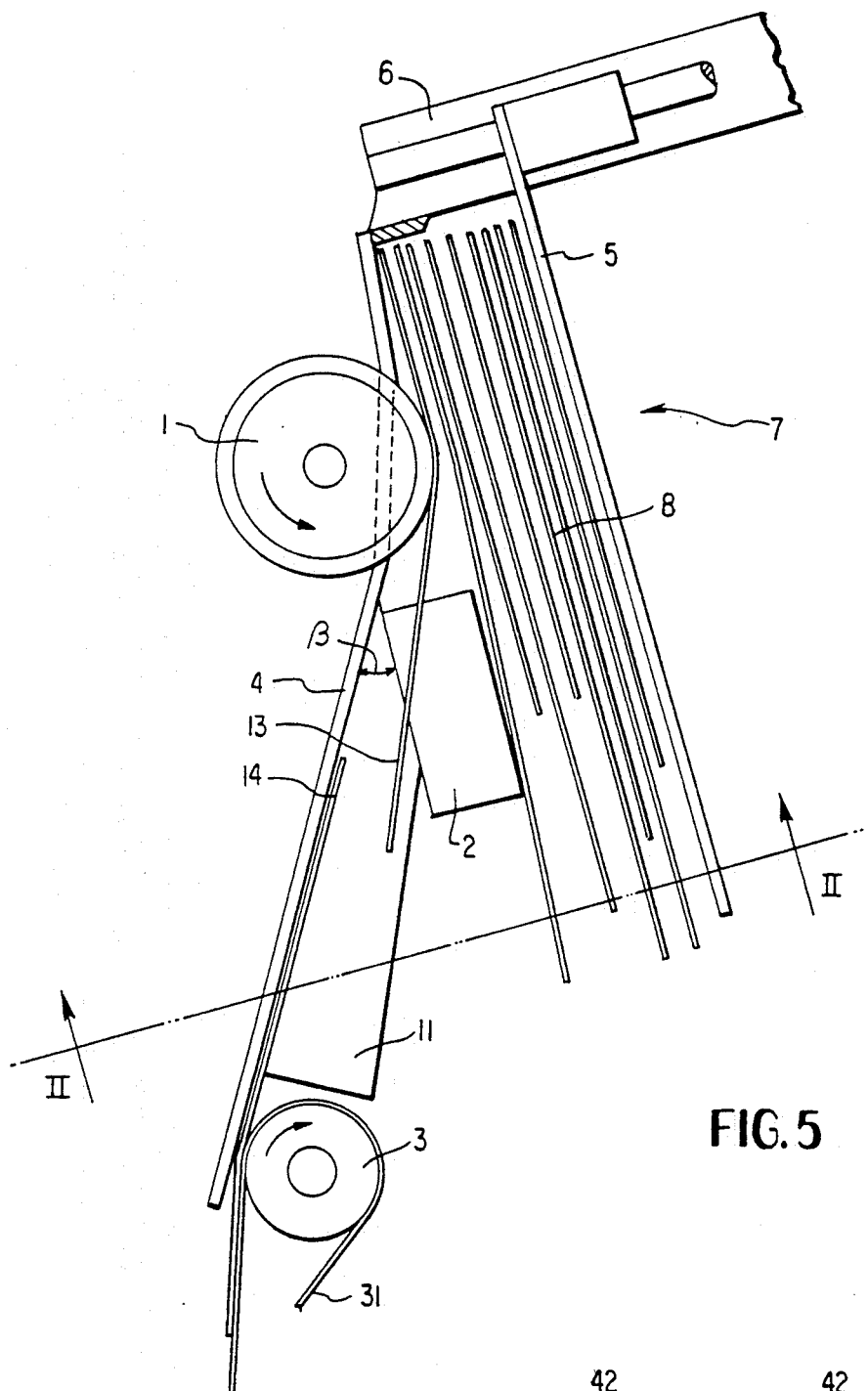
FIG. 5, a top view of a stacking compartment equipped with a long pressure roller.

Another advantageous feature of the invention provides for the axis of the pressure roller to extend almost parallel to the contact face 7 of the stacked article in such a manner that it forms an angle $\beta$ with the lower edge of an incoming article 14. The circumferential velocity vector V of pressure roller 2 is here selected to be such that it is equal to o slightly larger than the transporting velocity vector T. The circumferential velocity of stacking roller 1 is advisably adapted to the velocity in the transporting direction imparted to the article by the pressure roller. This embodiment is shown in a top view in FIG. 5.

In this embodiment, the leading lower edge of the article is already taken up as soon as it enters and, since the circumferential velocity vector V of pressure roller 2 is equal to or somewhat larger than the transporting velocity vector T, it is possible to guide the lower edge of the article over its entire length. This provides for good protection against the congestion of subsequent articles and thus against damage to the articles. In an advantageous manner, this configuration does not produce any annoying noise.

The circumferential velocity vector V is calculated as follows, where T = transporting velocity of the incoming article; $\beta$ = angle between guide fence 4 and the axis of the pressure roller:

$$V \geq \frac{T}{\sin \beta}$$

I claim:

1. A stacking device for flat flexible articles to be transported, the articles being of various widths and lengths, the device comprising:
   stacking compartment for receiving and stacking the articles in a stack therein;
   a transporting roller and a stacking roller in said stacking compartment, for engaging a flat surface of an incoming article to guide the incoming article in a transporting direction, said stacking roller being spaced from said transporting roller in the transporting direction;
   a contact surface disposed between said transporting roller and said stacking roller and extending in the transporting direction to support a bottom edge of the article; and
   a pressure roller means, disposed between said transporting roller and said stacking roller and below said contact surface, said pressure roller means having an upper circumferential surface continuously disposed during rotation thereof to engage only the lower edge of the article and urge the lower edge approximately perpendicularly to the transporting direction away from said transporting roller and toward the stack, said pressure roller means comprising a pressure roller and a belt trained over said pressure roller, said belt having said circumferential surface.

* * * * *